United States Patent [19]

Nathoo

[11] Patent Number: 4,943,222

[45] Date of Patent: Jul. 24, 1990

[54] APPARATUS FOR FORMING PREFORMED MATERIAL

[75] Inventor: Nazim S. Nathoo, Houston, Tex.

[73] Assignee: Shell Oil Company, Houston, Tex.

[21] Appl. No.: 338,683

[22] Filed: Apr. 17, 1989

[51] Int. Cl.$^5$ .................. B28B 21/38; B28B 21/40
[52] U.S. Cl. .................. 425/89; 425/390; 425/395; 425/DIG. 19; 425/DIG. 60; 264/511; 264/547
[58] Field of Search ............ 425/389, 390, 387.1, 425/388, 394, 395, DIG. 48, 406, 407, 408, 89, DIG. 19, DIG. 60; 264/510, 511, 512, 257, 258, 547

[56] References Cited

U.S. PATENT DOCUMENTS

| 2,575,734 | 11/1951 | Schulman | 425/DIG. 19 |
|---|---|---|---|
| 2,973,558 | 3/1961 | Stratton, Jr. | 264/511 |
| 3,492,392 | 1/1970 | Kasamatsu et al. | 264/511 |
| 3,923,586 | 12/1975 | Gross | 425/390 |
| 3,933,562 | 1/1976 | Cruckshank | 156/250 |
| 4,128,375 | 12/1978 | Schubart | 425/389 |
| 4,334,850 | 6/1982 | Garabedian | 425/389 |
| 4,715,923 | 12/1987 | Knoll | 425/389 |
| 4,808,362 | 2/1989 | Freeman | 264/102 |

FOREIGN PATENT DOCUMENTS

| 2852806 | 6/1979 | Fed. Rep. of Germany | 264/549 |
|---|---|---|---|
| 2920103 | 4/1981 | Fed. Rep. of Germany | 264/547 |
| 3041312 | 6/1982 | Fed. Rep. of Germany | 264/547 |
| 984867 | 1/1983 | U.S.S.R. | 425/389 |
| 1326458 | 7/1987 | U.S.S.R. | 425/389 |

OTHER PUBLICATIONS

Sales Literature of EMC Machinery, P. O. Box 9800, Fort Worth, TX.

"Preforming of Unifilo" by L. Pimini of Vetrotex St. Gobain, pub. in the Reinforced Plastics Congr. 13th, 1986.

Primary Examiner—Jay H. Woo
Assistant Examiner—K. P. Nguyen

[57] ABSTRACT

An apparatus is disclosed for the shaping of a sheet of preform material. A flat planar (heated) sheet of preform material is held tightly between two elastomeric sheets of the apparatus, the sheets and preform material forming a laminate assembly. The laminate assembly is then formed about a mold having the desired contours. The elastomeric sheets maintain the preform material parallel to the surface contours of the mold as the molding process proceeds. A fluid such as air is flowed between the mold surface and the laminate assembly during the forming process to prevent the elastomeric sheets from binding on the mold surface. Wrinkles are eliminated in the final shape of the preform material, and fiber distortion or tears or rips in the material are minimized due to the fluid lubrication between the mold surface and the laminate assembly.

2 Claims, 3 Drawing Sheets

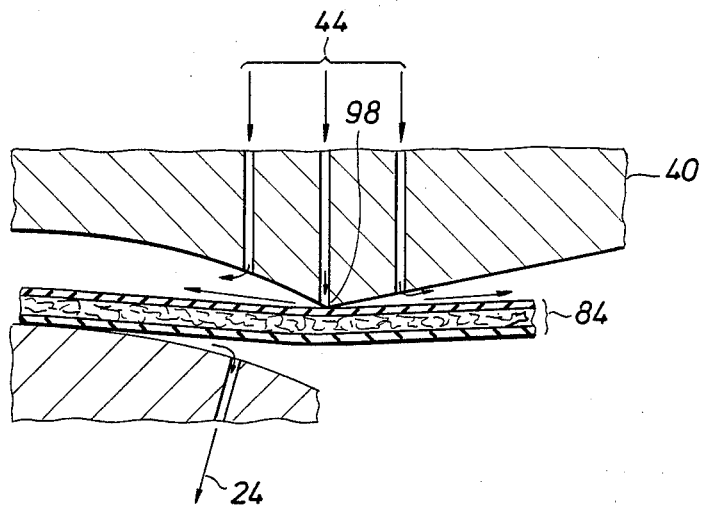
FIG. 7
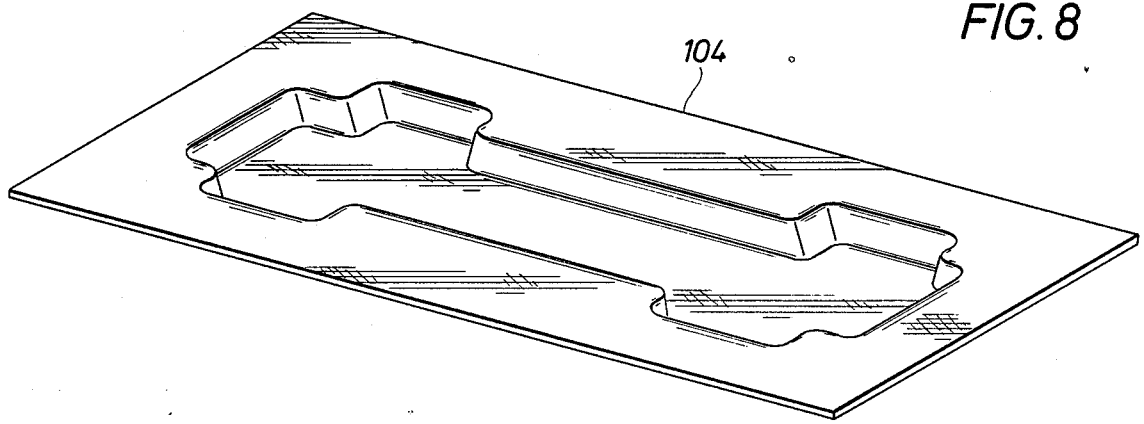
FIG. 8
FIG. 9
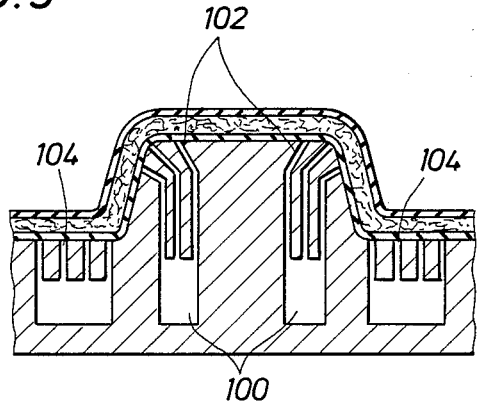
FIG. 10
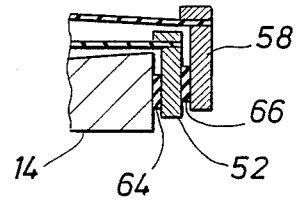

APPARATUS FOR FORMING PREFORMED MATERIAL

RELATED APPLICATION

This application is related to the application entitled "Method for Forming Preformed Material", Nazim S. Nathoo inventor, filed Apr. 17, 1989, Ser. No. 07/338681.

BACKGROUND OF THE INVENTION

1. Field of the Invention

The invention relates to an apparatus used to fabricate preforms for the resin transfer molding process. A preform is the fiberglass reinforcement package that has the shape of the desired composite part and has the correct glass type (chopped or continuous) and glass fiber orientation (random or directed). The use of preforms in this process advantageously reduces mold cycle times due to the more rapid positioning of the preformed reinforcement material in the mold. Fewer parts are rejected because the actual distribution of the reinforcement in the mold may be checked before molding.

2. Discussion of the Prior Art

There are two basic approaches for fabricating preforms for the resin transfer molding process. In the first approach, fiberglass reinforcement is deposited directly on a screen. One example of deposition methods in this category is chopped glass spray-up, or directed fiber placement. Such an approach may be studied in the article entitled "Preforming for Liquid Composite Molding" by E. P. Carley et al published in Proceedings of the 44th Annual Conference of the Society of the Plastic Industry, February, 1989 session 10-B.

When chopped glass strands are sprayed to form a preform, consistent production results are difficult to achieve because of the inclusion of a manual operation in the process. Local variations in fiber deposition up to 40% have been noted. Other difficulties in making performs symmetrically balanced with regard to their vertical rotational axis have been encountered. Additionally, the minimum radius of curvature which can be obtained using chopped strands and the air deposition process is relatively high due to the "springy" nature of the chopped strands.

The second basic approach for fabricating performs requires fabric as the starting point for reinforcement, as noted in "Preforming of Unifilo" by L. Pomini of Vetrotex St. Gobain, published in the Reinforced Plastics Congress 13th, 1986 by the British Plastics Federation Publication N293, London, England, and in "Preforming Continuous Filament Glass Mat" by Mark Hickling of Technical Services Vetrotex U.K. Ltd., Wallingford, Oxon, (available NTIS). The fabric may consist primarily of random, continuous fibers.

Regardless of the type of fabric used, it is necessary to cut the fabric in a pattern that will cover the mold surface with the correct fiber orientation.

Once the fabric is cut, it has to be formed to the shape of the mold surface. In hand-layup operations, the fabric is usually hand-fitted to the surface in a relatively labor-intensive manner. Other methods require that the fabric be tensioned in a machine frame while a set of matched-cavity dies form the fabric to the desired shape. (The design of such a machine may be studied, for example, in the sales literature of EMC Machinery, P. 0. Box 9800, Fort Worth, Tex.). This method generates 20 to 25% waste of preform material due to the necessary trimming of the edge of the fabric to the edge of the mold. This wastage is due to the excess material held by the frame beyond that required to reach the outer boundaries of the part. This method works best with random continuous glass mat.

Use of the machine frame is limited either to forming the fabric to a mold surface having simple contours, accepting a large number of wrinkles in the final shaped preform, or rejecting a large number of performs due to unacceptable fabric distortion or tearing.

In applications where tight control must be maintained on fabric thickness it is desirable to replace the chopped glass spray-up fiber deposition which has thickness variations with fabric having uniform thickness. Additionally, undesirable channels are not formed through fabric during the period that resin is flooded int the mold and through the fabric, because the fabric is not preferentially oriented as found in sheet molding compounds. Consequently, mechanical properties and surface finish are improved over sheet molding compound and sprayed-up fiber depositions by the use of fabric.

As the severity of the edge and contour topography within a mold increases, the fabric tends to wrinkle when forced around the edges and contours such that unwanted quantities of the fabric "bulge", fold over, wrinkle, and generally displace from a substantially planar position adjacent the mold surface. Current technology therefore limits the use of preform fabrics to use within molds having gentle contours.

Superplastic aluminum diaphragms have been used to form metals and, more recently, thermoplastic resin impregnated carbon fiber fabrics. Aluminum diaphragms were required in the case of the thermoplastic impregnated fabric because of the high temperature (approximately 700° F.) at which the thermoplastic resin softened to permit forming to occur. The diaphragms can be used only once and, as a result, the process is quite expensive and does not lend itself to desired preform mass production requirements.

More recently, the superplastic aluminum diaphragms have been replaced with a polymeric diaphragm, as noted in "Composites Update", University oi Delaware, Autumn 1987. This diaphragm, like the superplastic aluminum diaphragm, is not reusable.

An apparatus needs to be developed that allows the economical production of shaped performs having accentuated edge and contour sections. Such an apparatus should allow the efficient production of the shaped performs, without subjecting the fabric to wrinkling and/or tearing during the molding or formation process. Additionally, the apparatus should accept "cut to fit" fabric sections wherein the edges of the fabric do not need to be trimmed after the preform is shaped, thereby eliminating a time consuming and expensive trimming operation.

SUMMARY OF THE INVENTION

The apparatus of the present invention comprises two elastomeric sheets which hold the preform material in a precisely positioned manner therebetween, (the sheets and preform material forming what is described hereinafter as a laminate assembly). Precise positioning of the preform material between the sheets at the start of the preform :forming process eliminates the costly edge trimming operation normally required at the end of prior art preform fabrication processes. The apparatus also includes a mold having the desired contours, means for forming the laminate assembly about the mold contours, as well as means for lubricating the surface of the laminate assembly and the surface of the mold as the laminate assembly is formed about the mold.

A vacuum is developed between the two elastomeric sheets to hold the perform material therebetween to minimize wrinkles, tears, folds, or shifts in the desired position of the preform material during the shaping of the material. The two elastomeric sheets are reusable. After each preform is molded and removed from between the sheets, new unformed preform material is placed between the sheets and the forming process repeated.

Holding the preform material between the sheets ensures that the material does not wrinkle during the molding process, even when formed about difficult edges and contours, since the material is held parallel to the mold surface by the sheets during the forming process. The process therefore yields performs of complex shapes not previously obtainable by prior art methods. The elastomeric sheets also spread fabric forming stress concentrations away from "hard edges" on the mold surface such that distortion of the fabric is held within acceptable limits, so that the fabric does not tear during the forming process.

Use of the elastomeric sheets has an additional advantage. As the sheets with the preform material held therebetween are formed about the mold surface, lubrication is included between the sheets and the mold surface, such that binding of the sheets on the "hard edges" of the mold is eliminated. Lubrication in the preferred embodiment is Provided by flowing air between the sheets and the mold surface.

The sheets therefore "free float" over the hard edges on the mold surface. The sheets, being impermeable to air, do not allow the lubricating air flow to blow through the fabric and thereby prevent distortion of any of the fabric's fibers during the air lubrication process.

It is therefore an object of the present invention to provide an apparatus capable of manufacturing shaped preform material.

It is therefore an object of the present invention to eliminate the expensive edge trimming operation after each preform has been shaped by use of the apparatus of the present invention.

It is a feature of the present invention to hold the preform material between two elastomeric sheets, to prevent the material from shifting from the desired position so as to eliminate edge trimming operations.

It is a feature of the present invention to hold the preform material between two elastomeric sheets, to minimize wrinkles in the preform material and dissipate stress concentrations in the preform material and thereby eliminate or minimize tears in the fabric.

It is a feature of the present invention to flow fluid lubrication between the mold surface and the laminate assembly to prevent and/or minimize binding of the laminate assembly on the mold surface.

These and other features, objects and advantages of the present invention will become apparent from the following detailed description wherein reference is made to the figures in the accompanying drawings.

BRIEF DESCRIPTION OF THE DRAWINGS

FIG. 7 shows a detail of a portion of FIG. 4, in particular the air flow through the fluid lubrication openings and pas the laminate assembly surface.

FIG. 8 shows a schematic representation of a shaped preform formed by use of a female mold having accentuated contours.

FIG. 9 shows a schematic representation in cross-section of a concentration of fluid lubrication openings in a typical mold structure.

FIG. 10 shows a detail o: a portion of FIG. 3, in particular the seals used between the lower mold, and upper and lower sheet frames.

DESCRIPTION OF THE PREFERRED EMBODIMENT

Figure 1:
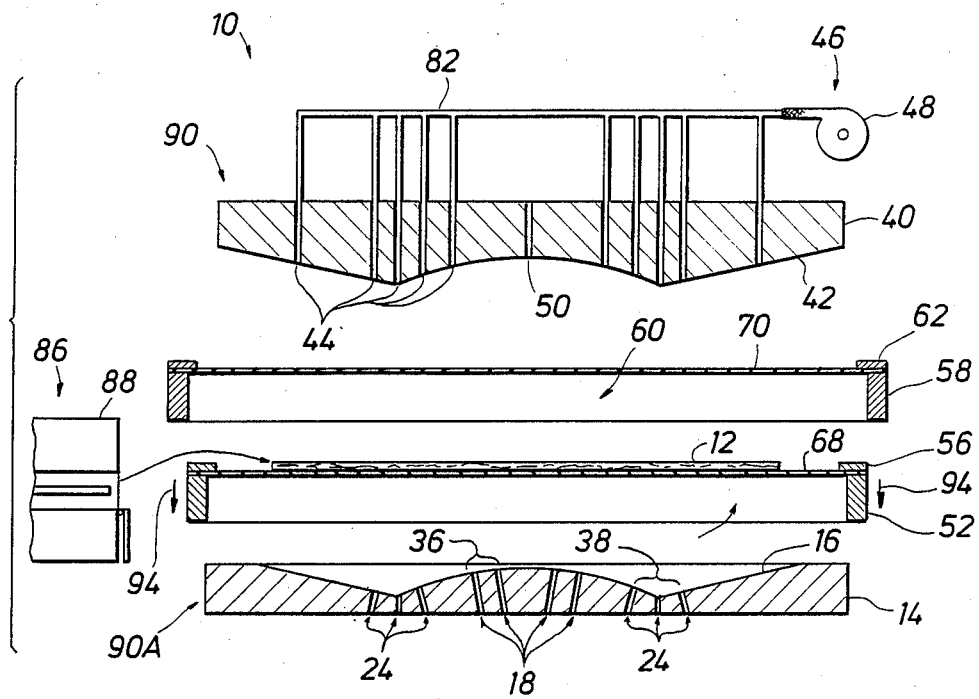
FIG. 1 shows a schematic representation in cross-section of the preform material shaping apparatus, including the upper mold, lower mold, upper and lower sheet frame, upper and lower elastomeric sheets, and preform material.

Referring now to FIG. 1 a preform material shaping apparatus 10 of the present invention useful for shaping preform material 12 is shown. The preform material may comprise continuous strand mat, chopped strand mat, biax and triax fabric, woven roving, or for example a combination of woven roving on one side with chopped strand mat on the other side. It should be well understood that other preform materials may be used in accordance with the teachings of the present invention.

The preform material in the preferred embodiment is coated with a sizing used to dimensionally stabilize the material, typically after the sizing (and the preform material) has been heated, formed and (hereafter allowed to cool in the desired finished shape. It should be well understood that other preform materials may be used that do not have a sizing material applied to them, if the materials are still capable of retaining the desired contours after removal from a mold.

The apparatus of the present invention can be seen to include a lower mold 14 having a lower mold surface 16 of the desired shape. The lower mold surface 16 includes at least one first fluid lubrication opening 18 defined therethrough and placed in fluid communication with first fluid lubrication means 20 (FIG. 2) such as a fluid lubrication pump 22, the fluid used for lubrication in the preferred embodiment being air. This should be well recognized that other mediums may be used to effectively lubricate and allow sliding of the surfaces of the laminate assembly relative to the respective mold surfaces, though it is recommended that dry substances such as powders be used if a gaseous substance such as air Is not available.

The lower mold surface 16 can also be seen to include at least one vacuum/vent opening 24 defined therethrough placed in fluid communication with vacuum/vent means 26 capable of allowing the fluid of choIce to flow either in or out of the vacuum/vent oPening 24. In a preferred embodiment, the vacuum/vent means would include fluid removal means 28 such as a fluid removal pump 30 well known to the art associated with a control valve 32. The vacuum/vent means 26 would also include another control valve 34 which when opened would connect the vacuum/vent openings 24 with the atmosphere.

Returning now to FIG. 1 the lower mold surface 16 can also be seen to include an upper edge section 36 and a lower recessed section 38 located at a lower elevation than the upper edge section, the first fluid lubrication opening 18 being defined through a portion of the upper edge section, the vacuum/vent opening 24 being defined through a portion of the lower recessed section.

The apparatus 10 further includes an upper mold 40 having an upper mold surface 42, said mold surface having at least one second fluid lubrication opening 44 defined therethrough and placed in fluid communication with a second fluid lubrication means 46, in a preferred embodiment comprising a fluid lubrication pump 48 such as an air pump well known to the art. The mold surface 42 further includes a fluid vent opening 50 defined upwardly therethrough.

A lower sheet frame 52 having a first opening 54 defined upwardly therethrough operatively carries or is connected to first clamp means 56 located about the upper periphery of the lower sheet frame.

An upper sheet frame 58 having a second opening 60 defined upwardly therethrough and being operatively connected to or carrying second clamp means 62 located about the upper periphery thereof is positioned above the lower sheet frame 52. The inner periphery of the upper sheet frame is sized to fit in close-spaced relationship adjacent the outer periphery of the lower sheet frame, the inner periphery of the lower sheet frame being sized to fit in close-spaced relationship adjacent the outer periphery of the lower mold 14.

The apparatus 10 further includes first seal means 64 (FIG. 10) such as an inflatable boot carried by the outer periphery of the lower mold or the inner periphery of the lower sheet frame and being inflatable to form a fluid-tight seal between the mold 14 and the frame 52. A second sea) means 66 of similar construction to the first seal means 64 is operatively engaged between the lower sheet frame 52 and the upper sheet frame 58 and inflatable therebetween to provide a fluid-tight seal between the frame 52 and the frame 58 when the frames 52, 58 are placed adjacent one another. It should be well recognized that many other pneumatic and/or mechanical seal systems may be used between the mold and frames 52, 58 to accomplish the same mechanical result.

Apparatus 10 also includes the lower elastomeric sheet 68 formed in a preferred embodiment from natural latex rubber having a thickness of 0.060 inch. It should be well recognized in other embodiments that other materials having other thicknesses may be used.

The lower elastomeric sheet in a preferred embodiment is clamped about the upper periphery of the lower sheet frame by the first clamp means 56, the first clamp means 56 in a preferred embodiment comprising a steel frame attached to the lower sheet frame by screws, incorporating a groove with sealant material therein about the sealing periphery so as to form a fluid seal between the frame clamp means 56 and elastomeric sheet 68, as is well known to the art. The lower sheet therefore forms a fluid-tight seal across the first opening 54, the lower sheet during a portion of the preformed material shaping process supporting the preform material 12.

Apparatus 10 also includes an upper elastomeric sheet 70 of similar material and construction to the lower elastomeric sheet 68, clamped about the upper periphery of the upper sheet frame by second clamp means 62, the upper sheet forming a fluid-tight seal across the second opening 60, the second clamp means 62 mechanically similar to the first claim means 56. When sheets 68, 70 are placed adjacent one another to hold the preform material, a fluid cavity 72 (FIG. 2) is defined therebetween, the fluid cavity placed in fluid communication with fluid removal means 74 in a preferred embodiment comprising a vacuum PumP 76 capable of establishing a vacuum between the sheets.

It should be noted that the life to failure of the upper elastomeric sheet has been increased to 200–300 cycles by placing a domestic bedsheet (not shown) over the upper surface of the sheet. The bedsheet is tied at its four corners to the upper sheet frame.

It is well recognized that pumps 30, 22, 76, 48 may be consolidated within a more extensively valved header system, as is well known to the art, so as to reduce the total number of pumps but increase the number of control valves needed to perform the process sequence.

Apparatus 10 further includes, when the sheets are placed adjacent the lower mold surface, a first fluid chamber 78 defined between the lower mold surface and the lower sheet, the first fluid chamber placed in fluid communication with the vacuum/vent means and the first fluid lubrication means. A second fluid chamber 80 (FIG. 4) is defined between the upper mold surface and the upper sheet when the upper surface and upper sheet are placed adjacent one another, the second fluid chamber being placed in fluid communication with the second fluid lubrication opening 44 and through the fluid lubrication header 82 (FIG. 1) with the second fluid lubrication means 46 and the fluid vent opening 50.

Figure 2:
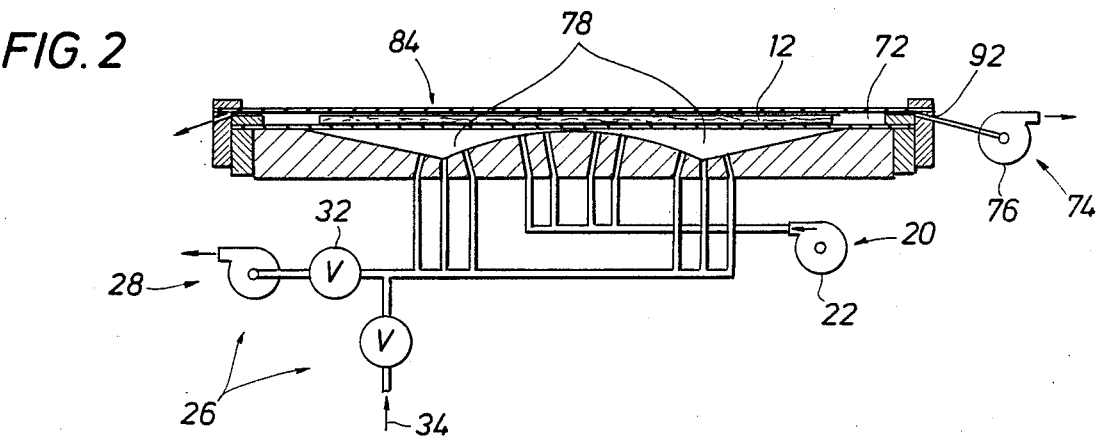
FIG. 2 shows a schematic representation in cross-section of the laminate assembly, comprised of the upper and lower elastomeric sheet and the perform material held therebetween, positioned above the surface of the lower mold.

It should be noted throughout the specification that, for the sake editorial brevity, when the preform material 12 is held between the two elastomeric sheets 68, 70, that the entire assembly of material 12 and sheets 68, 70 is referred to as the laminate assembly 84 (FIG. 2).

Apparatus 10 also includes in a preferred embodiment heater means 86 (FIG. 1) such as an oven 88 capable oil heating the preform material to a temperature sufficient to soften sizing coating the material and make the material plaiable and susceptible to subsequent forming and cooling to dimensionally stabilize the material in a preferred shape. In the preferred embodiment, the preform material consistign of four layers of a combination mat, (one side plain roving, one side chopped strand mat), manufactured by Fiberglass Industries Inc., 5 Edison Street, Amsterdam, N.Y., 12010, identified as Fab Matt 2215, is heated from room temperature to a temperature of approximately 350 degress Fahrenheit prior to beign placed above the lower elastomeric sheet. It is well recognized that other methods besides convection heating within the oven may be used to heat the peform material, such as with infrared radiation.

In simplest terms it can be seen that the apparatus of the invention includes the elastomeric sheet, the lower elastomeric sheet, and means for holding the preform material in a substantially planar manner between the upper elastomeric sheet and the lower elastomeric sheet so as to prevent wrinkle formation before, during or after the shaping process. Furthermore, the means for molding portions of the laminate assembly to a desired shaped can be seen to include the use of mold means 90, 90A (FIG. 1) which in a preferred meobdimetn comprise the upper mold 40 and the lower mold 14 respectively, portions of the upper mold surface and the lowr mold surface shaped to cooperatively engage about the laminate assembly 84.

The apparatus can also be seen to include means for placing lubrication in the space that separates the surface of the mold means 90, 90A and the laminate assembly 84 wherin the lubrication means would include first fluid lubrication means 20 and second fluid lubrication means 46 as discussed earlier.

The frames carrying the sheets and teh molds move relative to one another by use of a hydraulically-operated mechanical drive system operatively engaged the sheets and molds as is well known to the art. A working prototype machine has been designed, fabricated, and completed under the direction of the inventor by Doerfer Inc., 201 Washington street, Cedar Falls, Iowa, 50613, and has just recently commenced production of preformed material for a commercial part.

In operation, the method for shaping the preform material comprises the general steps of holding the preform material between the upper elastomeric sheet and the lower elastomeric sheet so as to minimize the wrinkles in the perform material, and thereafter molding the laminate assembly to the preferred shape. Holding the preform material between the sheets insures that the material is maintained parallel to the mold surface as the laminate assembly is formed about the various contours and edges of the mold. As mentioned before, the sheets distribute stress concentrations away from "hard edges" formed by drastic contour changes in the mold surface, thereby minimize or eliminate fiber distortions and/or tears or rips in the preform material.

The sheets being relatively impervious to fluid flow, also allow a fluid lubrication system to be used between the mold surface and the sheets to eliminate binding of the sheets on the mold surface. The sheets maintain the fibers comprising the fabric under tension as the laminate assembly is formed to the desired shape. This tensioning mechanism is the primary contributor to minimizing or eliminating wrinkles in the formed preform.

More specifically, the preform material is heated to a temperature sufficient to soften the sizing coating the material. The preform material is initially placed on the lower elastomeric sheet and the lower sheet frame 52 is lowered in the direction indicated by arrows 94 (FIG. 1) downwardly about the outer periphery of the lower mold. The upper sheet frame 58 is then lowered about the lower sheet frame. The second seal means 66 (FIG. 2) is actuated and the preform material is thereafter held between the sheets by actuation of fluid removal means 74 so as to withdraw air from between the sheets through evacuation opening 92 (FIG. 2) so as to form a vacuum of approximately 5 inches of mercury between the sheets. The preform material stack is now firmly tensioned between the two elastomerIc sheets.

Once a vacuum has been defined and the first seal means 64 actuated, the fIrst fluid chamber 78 is effectively defined by the boundaries of the laminate assembly and the lower mold surface, the first fluid chamber being in fluid communication with the first fluid lubrication openings 18 and vacuum/vent openings 24.

Portions of the laminate assembly are then formed about the upper edge section of the lower mold by removing fluid from the first fluid chamber such as by opening valve 32 and actuating fluid removal means 28. In a preferred embodiment a vacuum in the fluid chamber 78 is established at 18 inches mercury. Forming of the preform is initiated because atmospheric pressure above the laminate assembly forces it into the lower mold cavity. Complete forming of the preform would occur if the mold had simple contours. However, for complex shapes, complete forming of the preform to conform to the lower mold surface 16 is resisted by the frictional forces between the laminate assembly and the contact points of the lower mold surface. Increasing the vacuum level in the fluid chamber 78 does not cause additional conforming because the resistive friction forces increase proportionately to the level of vacuum applied.

Figure 3:
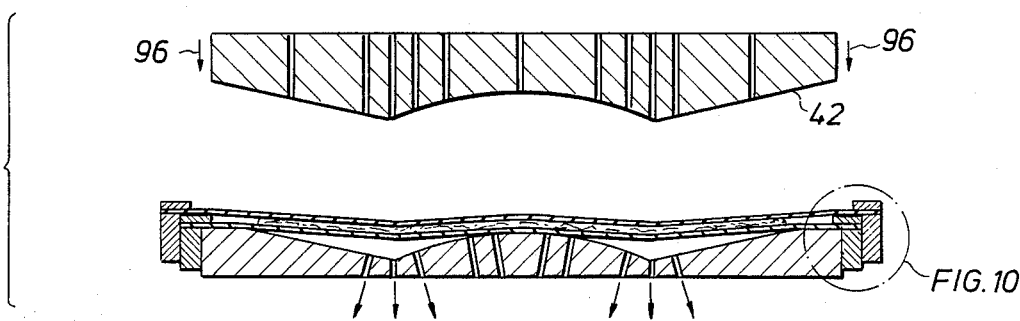
FIG. 3 shows a schematic representation in cross-section of the upper mold about to engage the top of the laminate assembly.

To complete the formation at this point and time, referring now to FIG. 3, the upper mold surface is moved downward (in the direction indicated by arrows 96) into contact with the laminate assembly.

Figure 4:
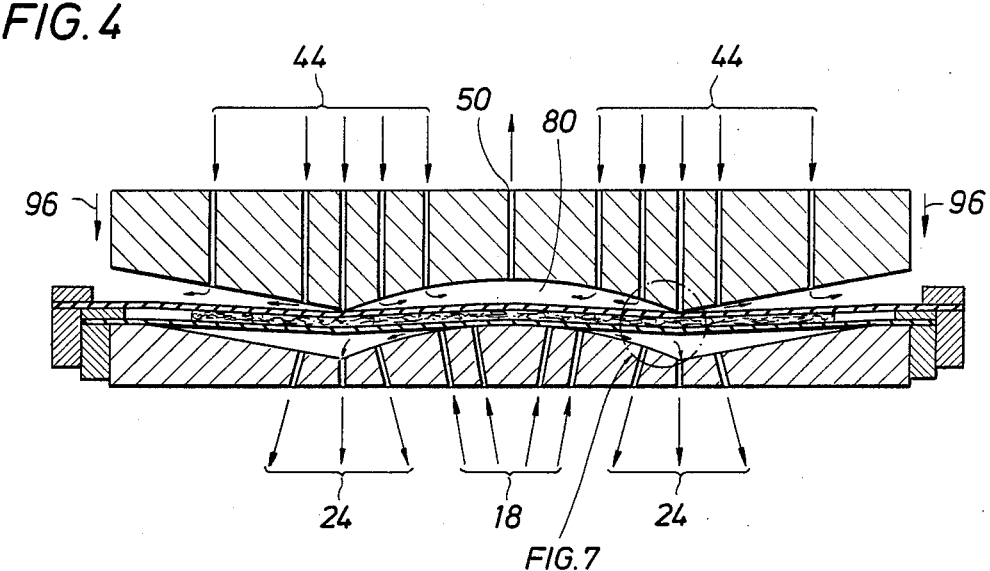
FIG. 4 shows a schematic representation in cross-section showing the upper mold engaging the laminate assembly.

Referring now to FIG. 4, additional portions of the laminate assembly are formed adjacent the lower mold surface by continued downward movement of the upper mold surface. At this point in time the fluid lubrication is initiated to allow the laminate assembly sheets to "free float" relative to both mold surfaces. The fluid lubrication process in the preferred embodiment comprises flooding air adjacent both sides of the Iaminate assembly through liquid lubrication openings 18 and 44. In the preferred embodiment the air lubrication flows through 8 holes in each mold surface, each hole having a $\frac{1}{8}$ inch diameter, the holes comprising the first and second fluid lubrication openings. The holes are connected via a regulator to the shop air system and the air pressure to the holes regulated from 25 to 32 psig.

Prior to start of the fluid lubrication process the vacuum beneath the laminate assembly is released by, for example, opening valve 34 (FIG. 2). The vacuum is seen to be removed from beneath the laminate assembly by adding fluid to the first fluid chamber. The vacuum is maintained between the two sheets to keep the preform material under tension The air that floods the upper surface of the laminate assembly either vents outwardly past the edge of the upper mold or vents from the second fluid chamber 80 through the fluid vent opening 50. The air that lubricates the bottom surface of the laminate assembly enters the fIrst fluid chamber 78 through lubrication openings 18 and vents through vacuum/vent openings 24.

Close study of FIG. 4 shows that the laminate assembly is allowed to float about the hard edges defined in the mold surface. Note for example FIG. 7 wherein the laminate assembly 84 is shown adjacent to but not binding on the ridge 98 formed in the upper mold surface.

Referring now to FIG. 9, in a representative embodiment of the present invention it can be seen that the fluid lubrication openings will typically be grouped at the portions of the mold surface having the hardest edges or sharpest contours such that air flow is maximized at the sites of possible binding of the laminate assembly. The fluid lubrication header 100 will typically be located adjacent and will supply fluid to fluid lubrication openings 102 that have been formed in the mold surface at the areas of minimum radius.

The vacuum/vent openings 104 have been located in a relatively flat section of the mold surface at some distance from the fluid lubrication openings 104, so as to encourage the fluid to flow across a large surface area prior to venting from the mold beneath the laminate assembly. It should be well understood that many other combinations of fluid lubrication and vacuum/vent openings may be used to accomplish the same results.

Figure 5:
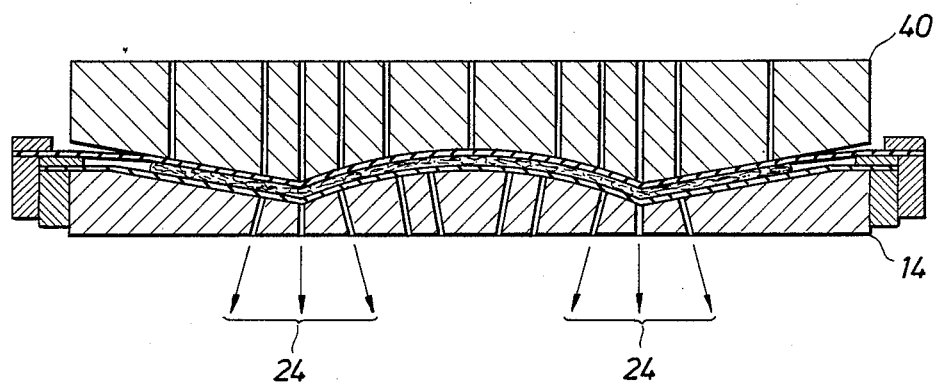
FIG. 5 shows a schematic representation in cross-section showing the upper and lower molds tightly compressed about the laminate assembly.

Referring now to FIG. 5 the preform material has now been molded to the contours of the upper and lower molds. The fluid lubrication process is secured and a vacuum is again reestablished beneath the laminate assembly by removal of fluid through the vacuum/vent openings 24. The upper mold and the lower mold are now at their closest spaced relationship.

After the vacuum has been reestablished under the laminate assembly the upper mold 40 is retracted, and after a 30 second delay to allow the preform material to partially cool the vacuum is removed from between the sheets and the fluid cavity 72 is vented to atmosphere. Simultaneous to the release of the vacuum by venting to atmosphere, the second seal means 66 between the sheets is released. After the second seal means 66 is released the upper elastomeric sheet is retracted upwardly and the system is held in this position for two minutes to allow :final cooling of the preformed material.

Figure 6:
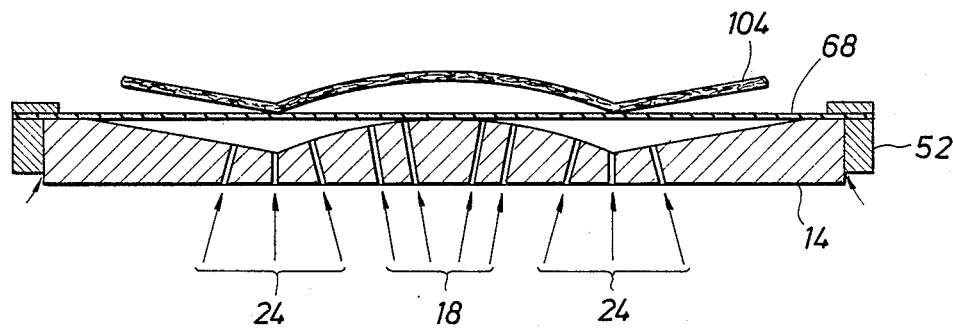
FIG. 6 shows a schematic representation in cross-section of the shaped preform supported by the lower elastomeric sheet.

Referring now to FIG. 6 after the two minute delay the vacuum is removed from beneath the lower elastomeric sheet by venting air in through openings 24, 18. The first seal means is also deactivated so as to allow the first fluid chamber 78 to be freely vented to atmosphere. The elasticity of the lower sheet 68 is used to demold the preform. The preform shaping cycle is now complete. The shape preform 104 is thereafter removed manually or by machine and the process repeated for a subsequent preform material shaping process.

Referring now to FIG. 8 a schematic representation of a successfully fabricated preform that is in the process of being incorporated within an automotive bumper structure is shown. An initially flat sheet of preform material was heated, molded, and the shaped preform 104 was removed from between the elastomeric sheets, without any wrinkles. Fiber distortion at the edges was minimized due to the preform material being held parallel to the mold during the forming process and also due to the actuatIon of the fluid lubrication process as the material was formed about the mold contour.

It should be well recognized that already partially-shaped preform material may be used at the start of the process, though in a preferred embodiment the preform material is initially flat.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings referred to in the foregoing description are illustrative only and are not intended as limitations on the scope of the invention.

I claim:

1. An apparatus for use in shaping fibrous preform material, said preform material coated with a sizing used to dimensionally stabilize said material after cooling of said sizing, said apparatus comprising;

a lower mold having non-planar lower mold surface, said non-planar lower mold surface having a first fluid lubrication opening defined therethrough placed in fluid communication with a first fluid lubrication means, said non-planar lower mold surface further including a vacuum/vent opening defined therethrough placed in fluid communication with vacuum/vent means, said non-planar lower mold surface having;

an upper edge section, and a lower recessed section located at a lower elevation than said upper edge section, said first fluid lubrication opening defined through a portion of said upper section, said vacuum/vent opening defined through a portion of said lower recessed section, an upper mold having a non-planar upper mold surface, said non-planar upper mold surface having a second fluid lubrication opening defined therethrough placed in fluid communication with a second fluid lubrication means, said non-planar upper mold surface further including a fluid vent opening defined therethrough, a lower sheet frame having a first opening defined upwardly therethrough and having first clamp means located about the upper periphery thereof, an upper sheet frame having a second opening defined upwardly therethrough and having second clamp means located about the upper periphery thereof, the inner periphery of said upper sheet fame sized to fit in close spaced relationship adjacent the outer periphery of said lower sheet frame, the inner periphery of said lower sheet frame sized to fit in close spaced relationship adjacent the outer periphery of said lower mold, first seal means operatively engaged between said lower mold and said lower sheet frame to form a fluid-tight seal therebetween, second seal means operatively engaged between said lower sheet frame and said upper sheet frame to form a fluid-tight seal therebetween, a lower elastomeric sheet clamped about the upper periphery of said lower sheet frame by said first clamp means, said lower sheet forming a fluid-tight seal across said first opening, said lower sheet supporting said preform material, an upper elastomeric sheet clamped about the upper periphery of said upper sheet frame by said second clamp means, said upper sheet forming a fluid-tight seal across said second opening, a fluid cavity defined between said upper and lower sheets, said fluid cavity placed in fluid communication with fluid removal means capable of establishing a vacuum between said sheets, a first fluid chamber defined between said lower mold surface and said lower sheet, said first fluid chamber being selectively placed in fluid communication with said vacuum/vent means and said first fluid lubrication means, and a second fluid chamber defined between said upper mold surface and said upper sheet, said second fluid chamber being selectively placed in fluid communication with said second fluid lubrication opening and said fluid vent opening, portions of said non-planar lower mold surface and said non-planar upper mold surface shaped to cooperatively engage about said upper elastomeric sheet and said lower elastomeric sheet and thereafter shape said fibrous preform material after said preform material is positioned between said sheets.

2. An apparatus adapted to shape fibrous preform material, said preform material coated with a sizing used to dimensionally stabilize said material after cooling of said sizing, said apparatus comprising;

a lower mold having a non-planar lower mold surface, said non-planar lower mold surface having a first fluid lubrication opening defined therethrough placeable in fluid communication with a first fluid lubrication means, said non-planar lower mold surface further including a vacuum/vent opening defined therethrough placeable in fluid communication with vacuum/vent means, said lower mold surface having;

an upper edge section, and a lower recessed section located at a lower elevation than said upper edge section, said first fluid lubrication opening defined through a portion of said upper edge section, said vacuum/vent opening defined through a portion of said lower recessed section, an upper mold having a non-planar upper mold surface, said non-planar upper mold surface having a second fluid lubrication opening defined therethrough placeable in fluid communication with a second fluid lubrication means, said non-planar upper mold surface further including a fluid vent opening defined therethrough, a lower sheet frame having a first opening defined upwardly therethrough and having first clamp means located about the upper periphery thereof, an upper sheet frame having a second opening defined upwardly therethrough and having second clamp means located about the upper periphery thereof, the inner periphery of said upper sheet frame sized to fit in close spaced relationship adjacent the outer periphery of said lower sheet frame, the inner periphery of said lower sheet frame sized to fit in close spaced relationship adjacent the outer periphery of said lower mold, first seal mans operatively engageable between said lower mold and said lower sheet frame to form a fluid-tight seal therebetween, second seal means operatively engageable between said lower sheet frame and said upper sheet frame to from a fluid-tight seal therebetween, a lower elastomeric sheet capable of being clamped about the upper periphery of said lower sheet frame by said first clamp means, said lower sheet when clamped forming a fluid-tight seal across said first opening, an upper elastomeric sheet capable of being clamped about the upper periphery of said upper sheet frame by said second clamp means, said upper sheet when clamped forming a fluid-tight seal across said second opening, a fluid cavity capable of being defined between said upper and lower sheets when said sheets are clamped by said clamp means, said fluid cavity placeable in fluid communication with fluid removal means capable of establishing a vacuum between said sheets, a first fluid chamber capable of being defined between said lower mold surface and said lower sheet, said first fluid chamber selectively placeable in fluid communication with said vacuum/vent means and said first fluid lubrication means, and a second fluid chamber capable of being defined between said upper mold surface and said upper sheet, said second fluid chamber selectively placeable in fluid communication with said second fluid lubrication opening and said fluid vent opening, portions of said non-planar lower mold surface and said non-planar upper mold surface shaped to cooperatively engage about said upper elastomeric sheet and said lower elastomeric sheet when said preform material is positioned between said sheets.

* * * * *